United States Patent [19]

Norman

[11] Patent Number: 4,844,819

[45] Date of Patent: Jul. 4, 1989

[54] OIL AND WATER SEPARATOR HAVING PLURAL NESTED TANKS

[76] Inventor: James M. Norman, 215 Wouth Hillcrest Dr., Goldsboro, N.C. 27530

[21] Appl. No.: 201,834

[22] Filed: Jun. 3, 1988

[51] Int. Cl.[4] .......................................... B01D 17/025
[52] U.S. Cl. .................................... 210/801; 210/806; 210/256; 210/521
[58] Field of Search ............... 210/800, 801, 802, 806, 210/109, 112, 255, 256, 322, 513, 521, 522, 787, 248

[56] References Cited

U.S. PATENT DOCUMENTS

| | | | |
|---|---|---|---|
| 745,519 | 12/1903 | Pravicha et al. | 210/513 |
| 966,022 | 8/1910 | Johnson | 210/513 |
| 1,442,306 | 1/1923 | Stonebraker | 210/255 |
| 2,134,113 | 10/1938 | Ehle | 210/802 |
| 2,214,248 | 9/1940 | Hawley | 210/532.1 |
| 2,405,838 | 8/1946 | Lawson et al. | 210/DIG. 5 |
| 2,651,414 | 9/1953 | Lawson | 210/DIG. 5 |
| 2,846,073 | 8/1958 | Hopper, Sr. | 210/256 |
| 2,872,935 | 2/1959 | Kenney | 210/513 |
| 3,303,932 | 2/1967 | Hirs et al. | 210/538 |
| 3,762,548 | 10/1973 | McCabe | 210/522 |
| 4,042,512 | 8/1977 | McCarthy et al. | 210/519 |
| 4,064,054 | 10/1977 | Anderson et al. | 210/DIG. 5 |
| 4,252,649 | 2/1981 | Favret, Jr. | 210/800 |
| 4,425,239 | 1/1984 | Jacocks et al. | 210/DIG. 5 |

FOREIGN PATENT DOCUMENTS 74761 3/1949 Norway .
2193906 2/1988 United Kingdom .

Primary Examiner—Richard V. Fisher
Assistant Examiner—Christopher Upton
Attorney, Agent, or Firm—Rhodes, Coats & Bennett

[57] ABSTRACT

An oil and water separator is disclosed having plural nested separating tanks. An oil/water mixture is introduced into the innermost tank. A fluid exchange means, such as a corrugated pipe wound to form a helix, transfers fluid from the innermost separating tank through successive separating tanks to the outermost tank. The majority of oil is trapped within the innermost tank and is transferred to a recovery tank by an overflow device. In outer separating tanks, a biological digestion of the small amount of remaining oil takes place.

8 Claims, 2 Drawing Sheets

OIL AND WATER SEPARATOR HAVING PLURAL NESTED TANKS

FIELD OF THE INVENTION

The present invention relates generally to oil/water separators and particularly to oil/water separators for purifying contaminated ground water.

BACKGROUND OF THE INVENTION

Oil/water separators are known which separate oil and other lightweight pollutants from water. Many such devices are used to purify contaminated water used in industrial processes before returning the water to the environment. Many other devices are used to clean up ground and surface water which becomes contaminated as a result of spillage. Some of the above-mentioned devices employ plural tanks as is shown in U.S. Pat. Nos. 4,252,649 and 3,303,932. Others employ corrugated baffle plates as shown in U.S. Pat. Nos. 2,214,248 and 4,042,512. Such devices, however, typically employ large tanks which have insufficient surface area to operate efficiently.

SUMMARY AND OBJECTS OF THE INVENTION

The present invention overcomes the aforementioned problems by providing an oil/water separator having plural nested separating tanks. A recovery tank is disposed below the plural nested separating tanks. An oil/water mixture is introduced into the innermost separating tank. A fluid exchange means transfers fluid from the innermost tank through successive separating tanks to the outermost tank. The majority of oil is trapped within the innermost tank and is stripped by an overflow mean which directs the oil into the recovery tank. In the outer tanks, oil is removed by biological processes. As the water progresses through each separating tank from the innermost tank to the outermost tank, the quality of water is improved at each stage.

In a preferred embodiment of the invention, the fluid exchange means comprises a spiral, flow through baffle system. Water is introduced into the inner tank through a downward spiral made of corrugated plastic tubing. From the innermost tank to the outermost tank, water is transferred through upward spirals also constructed of corrugated plastic tubing. Oil tends to adhere to the surfaces of the corrugated tubing and forms globules. Holes punched in the tubing allow the oil globules to escape and rise to the surface where it can then be stripped.

Accordingly, it is the primary object of the present invention to provide an oil/water separator which relies primarily upon the gravitational separation of oil from water.

Another object of the present invention is to provide an oil/water separator which enhances gravitational separation of oil from water by maximizing surface area in contact with the contaminated water so that oil globules form and then rise to the surface of the water.

Another object of the present invention is to provide an oil/water separator which makes efficient use of space by nesting plural separating tanks within each other.

Another object of the present invention is to provide an oil/water separator which is simple in construction and relatively maintenance free.

Other objects and advantages of the present invention will become apparent and obvious from a study of the following description and the accompanying drawings which are merely illustrative of such invention.

DETAILED DESCRIPTION OF THE INVENTION

Figure 1:
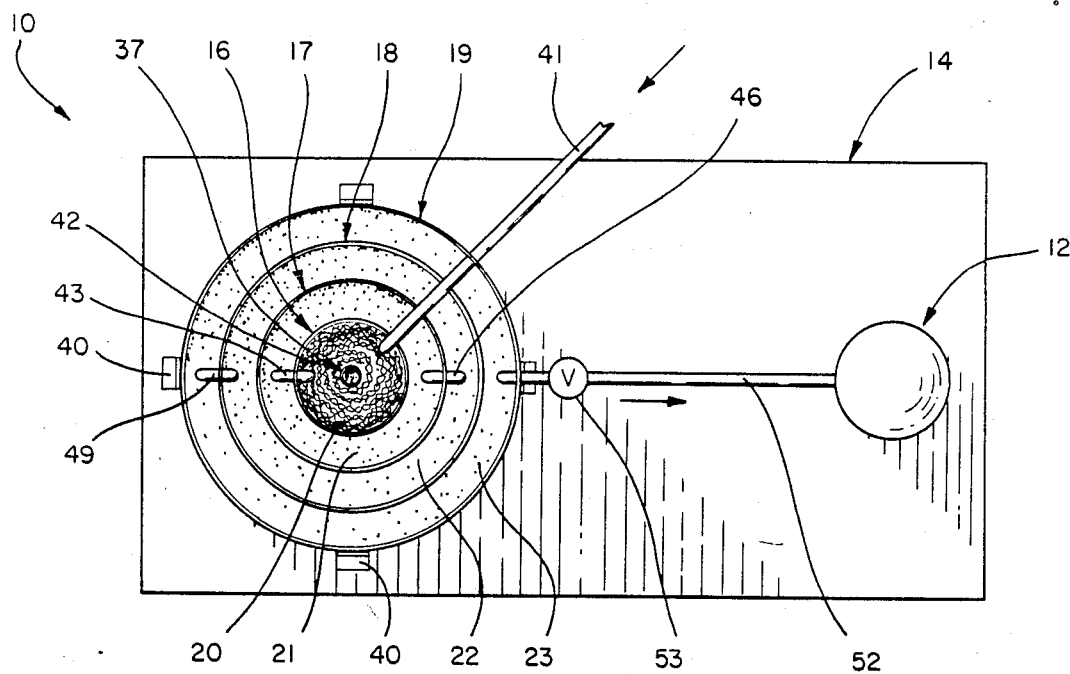
FIG. 1 is an elevation view of the oil/water separator of the present invention.

Referring now to the drawings, the oil/water separator of the present invention is illustrated and designated generally by the numeral 10. The oil/water separator 10 may be used in conjunction with a conventional air stripper 12 with which the oil/water separator 10 shares a base 14.

Figure 2:
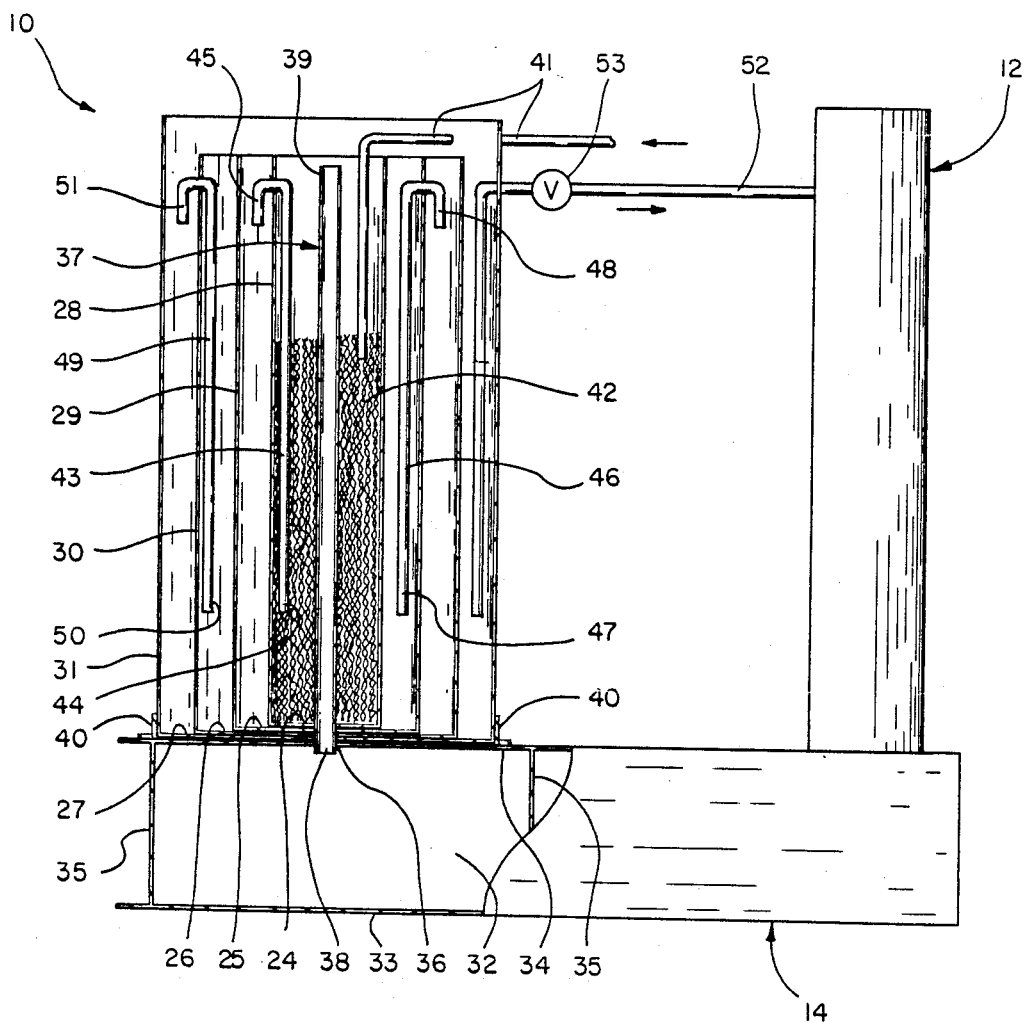
FIG. 2 is a top view thereof.

In FIG. 2, the construction of the oil/water separator 10 is illustrated. The oil/water separator 10 includes a plurality of separating tanks 16-19 which are differently sized but congruently shaped. The separating tanks 16-19 are nested within one another to define a plurality of radially spaced, separating compartments 20-23. In the preferred embodiment, the separating tanks 16-19 are in the form of cylinders and are concentrically arranged about the common, vertical axis. Each of the tanks include a bottom which are numbered respectively 24-27 and a vertical wall structure which are numbered respectively 28-31. The bottom 24 of tank 16 rests upon the bottom 25 of tank 17 which rests upon the bottom 26 of tank 18 which rests upon the bottom 27 of tank 19. When empty, tanks 16-18 can be lifted from tank 19 to facilitate cleaning of the tanks.

A recovery tank 32 is disposed below the separating tank 16-19 and preferably within base 14. The recovery tank 32 includes a bottom 33, a top 34, and a vertical wall structure 35. An opening 36 is formed in the top 34 of the recovery tank 32. An overflow pipe 37 having an outlet end 38 disposed within the recovery tank 32 extends upwardly from the recovery tank 32. When fully assembled, the inlet end 39 of overflow pipe 37 will be disposed within the upper portion of the inner separating compartment 20 to skim oil from the surface of the water within the compartment 20 as will be hereinafter described. In addition, the overflow pipe 37 serves as a centering device to position each of the separating tanks 16-19 with respect to one another.

The separating tanks 16-19 are mounted on top of the recovery tank and are secured by means of angle members 40 which are bolted to the top of the recovery tank 32 and outer separating tank 19.

Water containing oil is introduced into the inner compartment 20 through inlet pipe 41 which terminates within the inner compartment 20. In a preferred embodiment, the water is introduced through a screen pack 42 to slow the agitation of the mix and to prevent the oil from emulsifying into the water. A surged tank (not shown) may be placed at the entrance of the tank to allow for manifolding of many pumps and to dissipate excess air in the case of air lift pumps. Centrifugal pumps should be avoided where possible to prevent emulsifying of the mix.

When the fluid level reaches the upper portion of the separating compartment 20, fluid will be transferred through a fluid exchange pipe 43 to the next adjacent compartment 21. As can be seen in the figures, the inlet end 44 of the first fluid exchange pipe is disposed well below the fluid level within the innermost separating compartment 20. The fluid exchange pipe extends through wall 28 and includes an outlet end 45 which terminates within separating compartment 21. When the fluid level within the inner compartment 20 reaches the uppermost portion of the fluid exchange pipe 43, fluid will be pulled from the lower portion of the innermost compartment 20 and introduced into the next adjacent compartment 21.

A second fluid exchange pipe 46 having an inlet end 47 disposed within the second separating compartment 21 and an outlet end disposed within the third separating compartment 22 is provided for transferring fluid in the manner previously described from the second compartment to the third compartment. Similarly, a third fluid exchange pipe 49 having an inlet end 50 disposed within the third separating compartment 22 and an outlet end 51 disposed within the outermost separating compartment 23 transfers fluid from the lower portion of the third separating compartment 22 to the outermost separating compartment 23. An outlet pipe 52 provided with a solenoid valve 53 provides means for withdrawing purified water from the oil/water separator 10.

The present invention relies on gravitational separation of oil from water. Water containing oil is introduced into the inner compartment 20 through inlet pipe 41. Oil particles within the water tend to adhere to the vertical wall structure 28 where it combines with other oil particles to form large oil globules. The aggregation of oil on the vertical oval structure 28 can be facilitated by coating the wall structure with synthetic materials such as polypropylene. The formation of large oil globules facilitates buoyant separation of the oil from water causing the oil to rise to the surface of the water. When the water level within the innermost separating compartment 20 reaches the uppermost portion of the first fluid exchange pipe 43, water entering the inlet end 44 of the fluid exchange pipe 43 will be forced by the water pressure within the inner compartment 20 to the next adjacent compartment 21. Because the inlet end 44 is disposed well below the water line, water which is introduced into the second compartment 21 is substantially free of oil particles.

Water is transferred from the second compartment 21 to the third compartment 22 and from the third compartment 22 to the fourth compartment 23 in the manner previously described. At each stage, the quality of the water is improved so that only substantially purified water reaches the outlet pipe 52.

When a preset quantity of oil rises to the surface in the inner compartment 20, the solenoid valve 53 will stop outflow from the oil/water separator 10 and raise the level of fluid within the separating tanks 16-19. When the fluid level rises to the inlet end of the overflow pipe, the oil will be skimmed from the surface of the water and passed through the overflow pipe to the recovery tank until there is no longer any oil on the surface. The small amounts of oil which manage to pass through the fluid exchange system to the outer tanks 21 through 23 can be easily removed by biological processes well known to those skilled in the art.

In certain circumstances, it may be desirable to use the oil/water separator 10 in connection with a conventional air stripper 12 which is connected in series with the oil/water separator 10 as shown in FIG. 1. Outlet pipe 52 introduces water from the oil/water separator 10 into the upper end of the air stripper 12. The water migrates downwardly through a carbon stack while air is forced upwardly through the stack from the bottom. Any water exiting from the air stripper 12 would meet or exceed all state and federal requirements.

Figure 3:
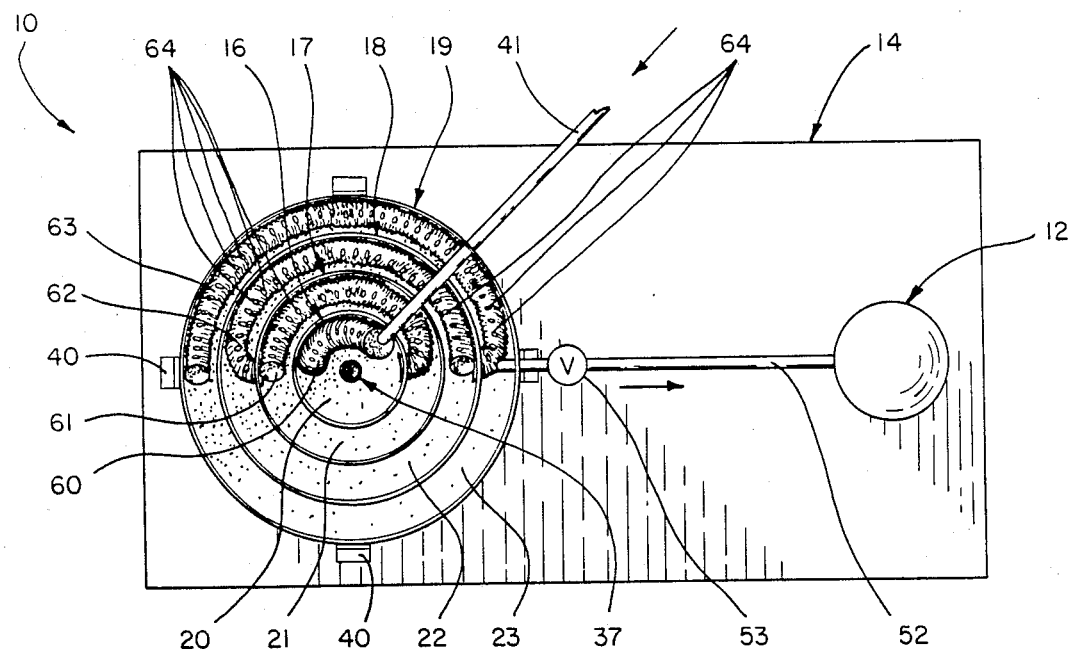
FIG. 3 is a section view of a second embodiment thereof.
Figure 4:
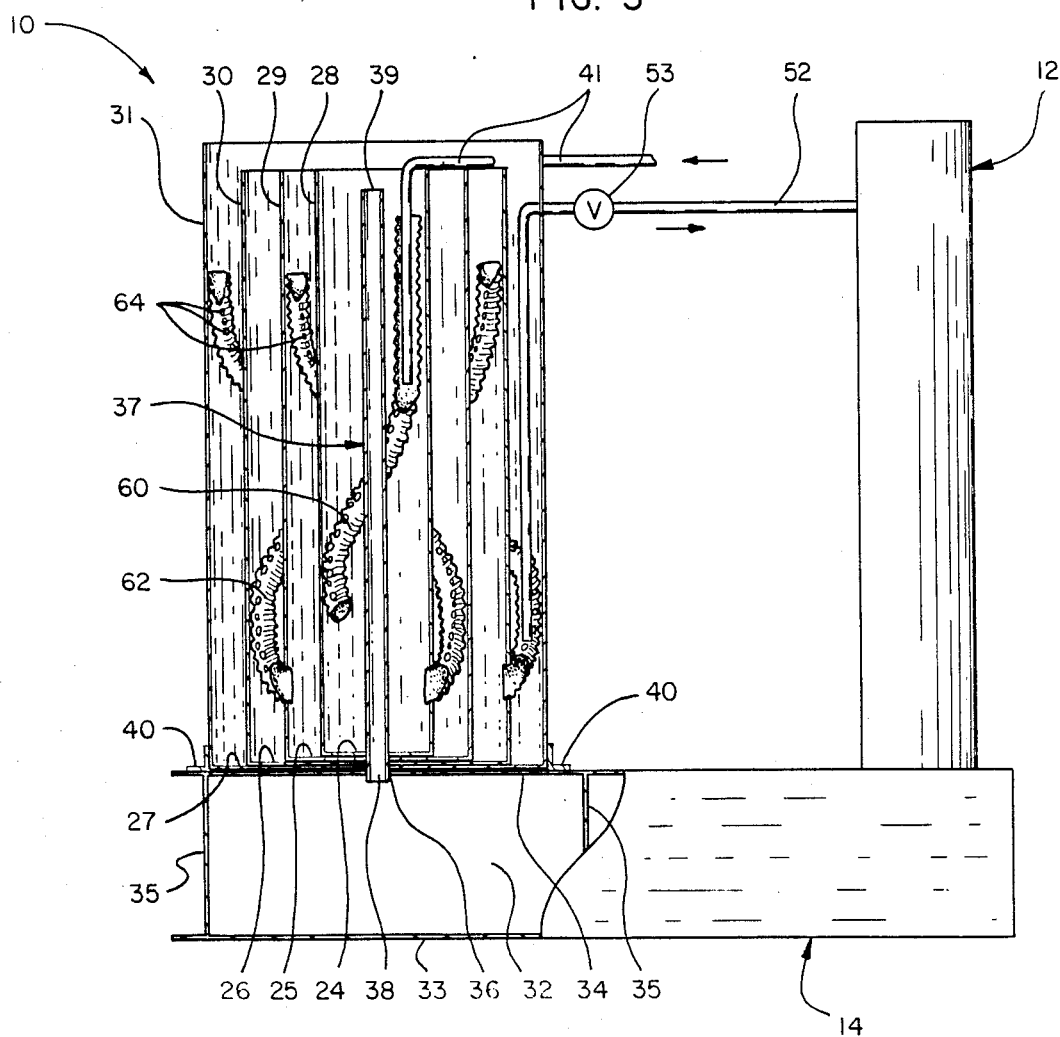
FIG. 4 is a top view thereof.

Referring now to FIG. 3, a second embodiment of the present invention is shown. The second embodiment is constructed substantially the same as the first embodiment, the difference being the substitution of flow through baffles for the fluid exchange pipes 43, 46, and 49. In particular, a first flow through baffle 60 is wrapped about the overflow pipe 37 to form a helix. Inlet pipe 41 introduces contaminated water into the upper end of the flow-through baffle 60 which then cascades through the downward spiral to the lower outlet end. Flow-through baffles 61, 62, and 63 include inlet ends disposed within the lower portion of respective separating tank and an outlet end disposed within the upper portion of the next adjacent separating tank. Each of the flow through baffles 60-63 are constructed of a plastic corrugated tubing.

Water introduced through the inlet pipe 41 travels through the downward spiral of the flow through baffle 60 and begins filling the innermost separating compartment 20. From the innermost compartment 20, water is lifted from the lower portion of the innermost separating compartment to the upper portion of the next adjacent compartment 21 through the upward spiral of the flow through baffle 61. In a similar manner, the upward spiral of the flow through baffle 62 and 63 transfer water to the third and fourth separating compartments.

The corrugations of the flow through baffles 60-63 greatly increases the surface area in contact with the water, thus, facilitating aggregation of oil particles on those surfaces. The oil has an affinity for the plastic materials used to construct the flow-through baffles and tends to adhere to those surfaces. As oil globules form on the surface of the corrugated baffles 60-63, the oil globules rise through openings 64 formed in the baffles to the surface of the water. Thus, the flow-through baffles 60-63 enhance the aggregation and buoyant separation of oil from water.

Because of the nested arrangement of the tanks, the oil has a much larger surface area on which to aggregate thereby improving the efficiency of the oil/water separator. In addition, the nested arrangement greatly decreases the space requirements as compared to conventional separators. The spiral flow-through baffles of the second embodiment also facilitate aggregation and buoyant separation of oil from water.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:
1. A method for separating oil from water comprising:
 a. introducing contaminated water containing oil into a first separating tank;
 b. allowing said oil to gravitationally separate from said water and rise to the surface of said water;
 c. transferring separated water through a helical, corrugated pipe from said first separating tank to a second separating tank encompassing said first separating tank; and d. transferring the separated oil from said first separating tank to a recovery tank.

2. The method for separating oil and water according to claim 1 further including the step of facilitating the aggregation of oil particles by forming the corrugated pipes with a plastic material to which oil particles have an affinity so that said oil particles aggregate on the inner surface of said corrugated pipe.

3. The method of separating oil and water according to claim 1, including the step of facilitating buoyant separation of oil from water by allowing oil globules forming on the inner surface of said corrugated pipe to rise through longitudinally spaced openings formed in said corrugated pipe to the surface of water in the respective separating tank.

4. An apparatus for separating oil from water comprising:

(a) a plurality of nested separating tanks;
(b) inlet means for introducing contaminated water containing oil into the innermost separating tank where the oil gravitationally separates from the water;
(c) a plurality of fluid exchange pipes for transferring fluid from each inner tank to the next adjacent outer tank, wherein each fluid exchange pipe comprises a corrugated pipe wound about the inner tank to form a helix having an inlet disposed near the bottom of the inner tank and an outlet disposed near the top of the adjacent outer tank;
(d) an overflow pipe having an inlet disposed near the top of the innermost tank for drawing off oil separated from the water in the innermost tank; and
(e) an outlet means for drawing water from outermost separate tank.

5. The apparatus according to claim 4 wherein the inlet means includes a corrugated pipe wound about the overflow pipe to form a helix.

6. The apparatus according to claim 4 wherein said corrugated pipe is constructed of a material capable of attracting oil so that oil contained within the water will tend to adhere to the surface of the corrugated pipe.

7. The apparatus according to claim 6 wherein the corrugated pipe is constructed of polypropylene.

8. The apparatus according to claim 4 wherein each corrugated pipe includes a plurality of openings extending along the length of said pipe to permit oil globules forming on the inner surface of the pipe to rise through the opening to the surface of the water.

* * * * *